(12) United States Patent
Kim et al.

(10) Patent No.: US 11,760,174 B2
(45) Date of Patent: Sep. 19, 2023

(54) FLUSH GLASS APPARATUS

(71) Applicants: Hyundai Motor Company, Seoul (KR); Kia Motors Corporation, Seoul (KR); Webasto Korea Holdings Ltd., Ulsan (KR)

(72) Inventors: Jeong Hyeon Kim, Suwon-si (KR); Seong Min Gwak, Yangsan-si (KR); Su Yun Choi, Ulsan (KR)

(73) Assignees: Hyundai Motor Company, Seoul (KR); Kia Motors Corporation, Seoul (KR); Webasto Korea Holdings Ltd., Ulsan (KR)

( * ) Notice: Subject to any disclaimer, the term of this patent is extended or adjusted under 35 U.S.C. 154(b) by 444 days.

(21) Appl. No.: 17/036,216

(22) Filed: Sep. 29, 2020

(65) Prior Publication Data

US 2021/0170834 A1 Jun. 10, 2021

(30) Foreign Application Priority Data

Dec. 10, 2019 (KR) .................. 10-2019-0163607

(51) Int. Cl.
| | |
|---|---|
| *B60J 1/16* | (2006.01) |
| *B60J 1/20* | (2006.01) |
| *E05B 13/00* | (2006.01) |
| *E05C 9/00* | (2006.01) |

(52) U.S. Cl.
CPC ............ *B60J 1/16* (2013.01); *E05B 13/002* (2013.01); *E05C 9/008* (2013.01)

(58) Field of Classification Search
CPC .. B60J 1/16; E05B 13/002; E05B 2065/0805; E05B 65/0823; E05C 9/008; E05C 17/62; E05C 17/64; E05C 3/22; E05C 9/00; E05C 19/001; E05C 9/08; E05C 3/004; E05C 3/167
USPC ............. 292/44, 45, 49, 197, 198, DIG. 46, 292/DIG. 20, DIG. 47, 92
See application file for complete search history.

(56) References Cited

U.S. PATENT DOCUMENTS 10,370,883 B2 * 8/2019 Otsubo ................ E06B 3/4627

* cited by examiner

*Primary Examiner* — Kristina R Fulton
*Assistant Examiner* — Thomas L Neubauer
(74) *Attorney, Agent, or Firm* — Slater Matsil, LLP

(57) ABSTRACT

A flush glass apparatus includes an operation glass comprising a glass portion and a frame and configured to open and close an opening of a fixed glass by sliding in a lateral direction, and a locking device configured to lock and unlock the operation glass, wherein the locking device comprises an operation handle installed on the frame, an upper locking lever installed on an upper side of the frame, a first lower locking lever installed on a lower side of the frame, a second lower locking lever installed on the lower side of the frame, an upper operation member installed on the upper side of the frame and connected to the operation handle, and a lower operation member installed on the lower side of the frame and connected to the operation handle.

20 Claims, 12 Drawing Sheets

FIG. 6A
FIG. 6B
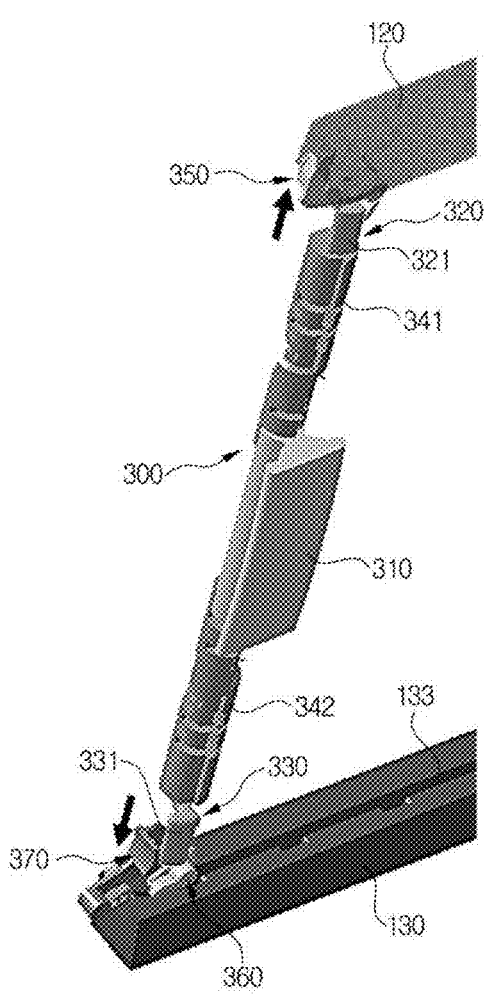
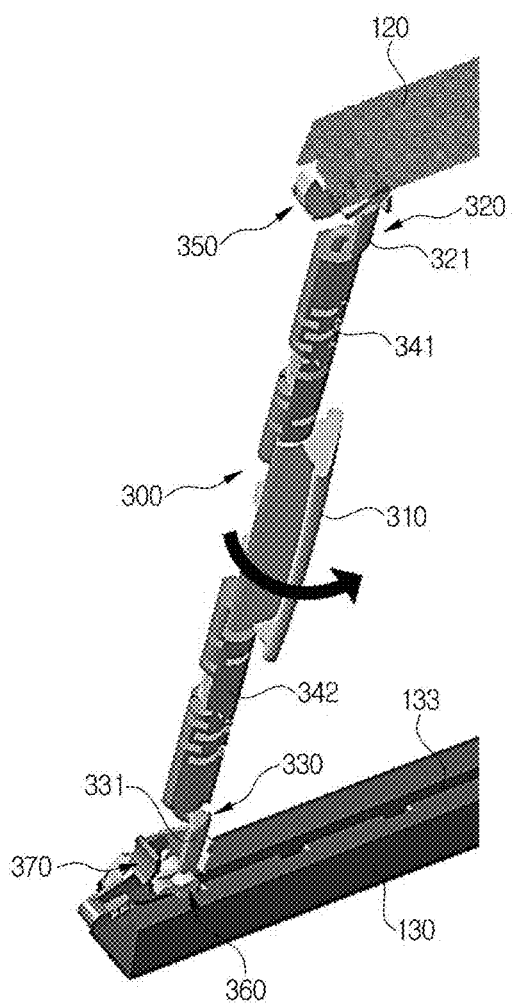

FLUSH GLASS APPARATUS

CROSS-REFERENCE TO RELATED APPLICATIONS

This application claims priority to Korean Patent Application No. 10-2019-0163607, filed on Dec. 10, 2019, which application is hereby incorporated herein by reference.

TECHNICAL FIELD

The disclosure relates to a flush glass apparatus.

BACKGROUND

Large passenger vehicles such as RVs (Recreational Vehicles) and SUVs (Sport Utility Vehicles) are equipped with a flush glass apparatus.

The flush glass apparatus includes a fixed glass having an opening, an operation glass moving in a sliding manner to open and close the opening of the fixed glass, and a locking device locking the operation glass in a closed state or releasing the locking to open the operation glass.

The locking device may include locking pins installed on the operation glass to be able to ascend and descend, restoration springs restoring the locking pins in a locking direction, and a plurality of operation handles for moving the locking pins in an unlocking direction.

However, because the flush glass apparatus described above has a structure in which a user moves the plurality of operation handles in the vertical direction to unlock the restoration springs, it is difficult to open and close the operation glass. In addition, because the plurality of operation handles is not restored during the opening of the operation glass, it is difficult to provide a beautiful appearance.

SUMMARY

The disclosure relates to a flush glass apparatus. Particular embodiments relate to a flush glass apparatus capable of easily opening and closing an operation glass and stably binding the operation glass when the operation glass is closed.

It is an aspect of embodiments of the disclosure to provide a flush glass apparatus capable of easily opening and closing an operation glass by an easy operation of a locking device.

It is another aspect of embodiments of the disclosure to provide a flush glass apparatus capable of providing a beautiful appearance by restoring an operation handle in a state in which an operation glass is opened or closed. Additional aspects of embodiments of the disclosure will be set forth in part in the description which follows and, in part, will be obvious from the description, or may be learned by practice of the disclosure.

In accordance with an embodiment of the disclosure, a flush glass apparatus includes an operation glass including a glass portion and a frame and configured to open and close an opening of a fixed glass by sliding in a lateral direction, and a locking device configured to lock and unlock the operation glass, wherein the locking device includes an operation handle installed on the frame to be rotated left and right and configured to be restored to its original state by a restoration spring, an upper locking lever installed on an upper side of the frame and configured to lock the operation glass by rotating in a locking direction by an elastic restoring force when the operation glass is completely closed, a first lower locking lever installed on a lower side of the frame and configured to lock the operation glass by rotating in the locking direction by an elastic restoring force when the operation glass is completely closed, a second lower locking lever installed on the lower side of the frame and configured to lock the operation glass by rotating in the locking direction by an elastic restoring force when the operation glass is completely opened, an upper operation member installed on the upper side of the frame, connected to the operation handle, and configured to rotate the upper locking lever in a direction of releasing the locking when rotating in an opening direction by an operation of the operation handle, and a lower operation member installed on the lower side of the frame, connected to the operation handle, and configured to rotate the first lower locking lever in the direction of releasing the locking when rotating in the opening direction by the operation of the operation handle and to rotate the second lower locking lever in the direction of releasing the locking when rotating in a closing direction by the operation of the operation handle.

The flush glass apparatus may further include an upper rail comprising an upper guide groove to slidingly support guide pins provided on an upper portion of the frame, and a lower rail comprising a lower guide groove to slidingly support guide pins provided on a lower portion of the frame.

The upper guide groove and the lower guide groove each may include a curved guide portion configured to induce the guide pins to an outdoor side so that an outer surface of the operation glass forms the same plane as an outer surface of the fixed glass when the operation glass is completely closed, and a locking groove formed deeper upward or downward than the upper guide groove or the lower guide groove so that the upper locking lever or the first lower locking lever is caught thereon in a state in which the operation glass is completely closed.

The upper locking lever may include an upper locking portion provided at an eccentric position from a rotation shaft thereof and configured to enter the locking groove of the upper guide groove by rotation, and a contact portion pressed by an eccentric rotation portion of the upper operation member to rotate in the direction of releasing the locking when the upper operation member rotates in the direction of opening the operation glass.

The lower guide groove may include a plurality of intermediate locking grooves formed deeper downward than the lower guide groove at positions spaced apart from each other in a moving direction of the operation glass so that the first lower locking lever or the second lower locking lever is caught thereon in a process of opening or closing the operation glass, and a locking groove formed deeper downward than the lower guide groove so that the second lower locking lever is caught thereon in a state in which the operation glass is completely opened.

The first lower locking lever may include a first lower locking portion provided at an eccentric position from a rotation shaft thereof and configured to enter a closed-side locking groove of the lower guide groove or one of the intermediate locking grooves by rotation, and a first contact portion pressed by an eccentric rotation portion of the lower operation member to rotate in the direction of releasing the locking when the lower operation member rotates in the direction of opening the operation glass.

The second lower locking lever may include a second lower locking portion provided at an eccentric position from a rotation shaft thereof and configured to enter an opened-side locking groove of the lower guide groove or one of the intermediate locking grooves by rotation, and a second contact portion pressed by the eccentric rotation portion of the lower operation member to rotate in the direction of releasing the locking when the lower operation member rotates in the direction of closing the operation glass.

The first lower locking portion may include a first curved portion provided at a lower side of a side surface thereof in the closing direction so that the operation glass moves beyond the intermediate locking groove when moving in the closing direction.

The second lower locking portion may include a second curved portion provided at a lower side of a side surface thereof in the opening direction so that the operation glass moves beyond the intermediate locking groove when moving in the opening direction.

A width of the intermediate locking groove in the opening and closing directions may be equal to or larger than a width of the first or second lower locking portion in the opening and closing directions.

The flush glass apparatus may further include an upper connection shaft connecting the upper operation member and the operation handle and rotatably supported on the frame, and a lower connection shaft connecting the lower operation member and the operation handle and rotatably supported on the frame.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 6A and 6B are perspective views of the locking device of the flush glass apparatus according to an embodiment of the disclosure, illustrating a state before operation and a state after operation, respectively;

DETAILED DESCRIPTION OF ILLUSTRATIVE EMBODIMENTS

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, pails not related to the description are omitted from the drawings, and the width, length, thickness, etc. of the components may be exaggerated for convenience.

Figure 1:
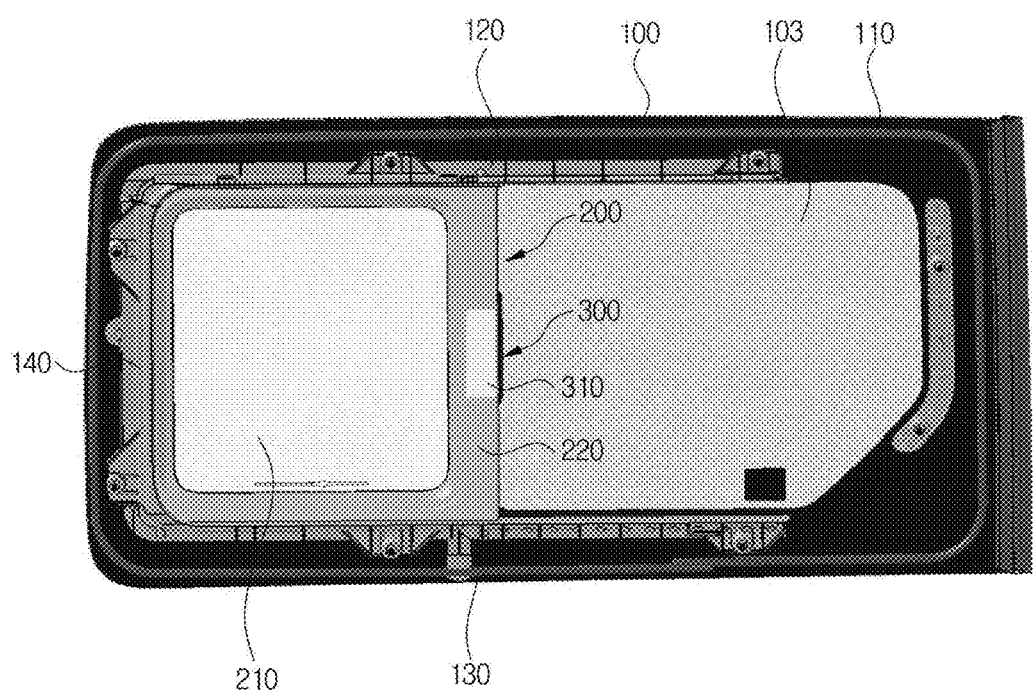
FIG. 1 is a front view of a flush glass apparatus according to an embodiment of the disclosure when an operation glass is closed.
Figure 2:
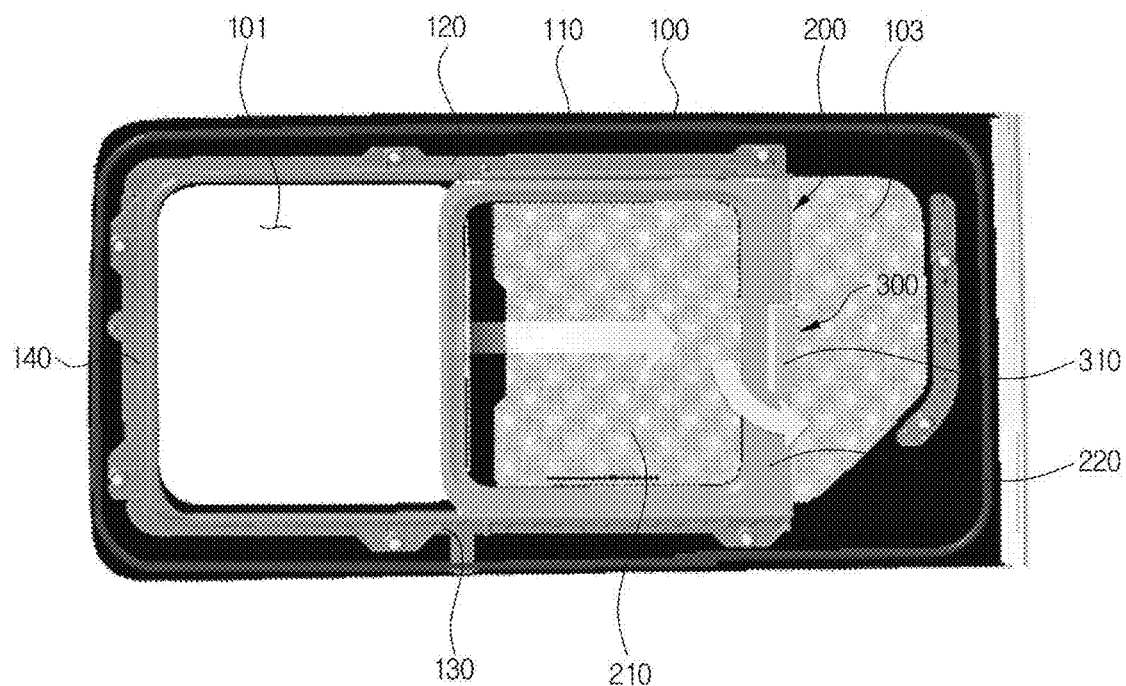
FIG. 2 is a front view of the flush glass apparatus according to an embodiment of the disclosure when the operation glass is opened.

Referring to FIGS. 1 and 2, a flush glass apparatus according to an embodiment of the disclosure includes a fixed glass 100 provided with an opening 101, an operation glass 200 configured to move in a lateral sliding manner to open and close the opening 101 of the fixed glass 100, and a locking device 300 configured to lock the operation glass 200 in a state of being closed or release the locking to open the operation glass 200.

Figure 3:
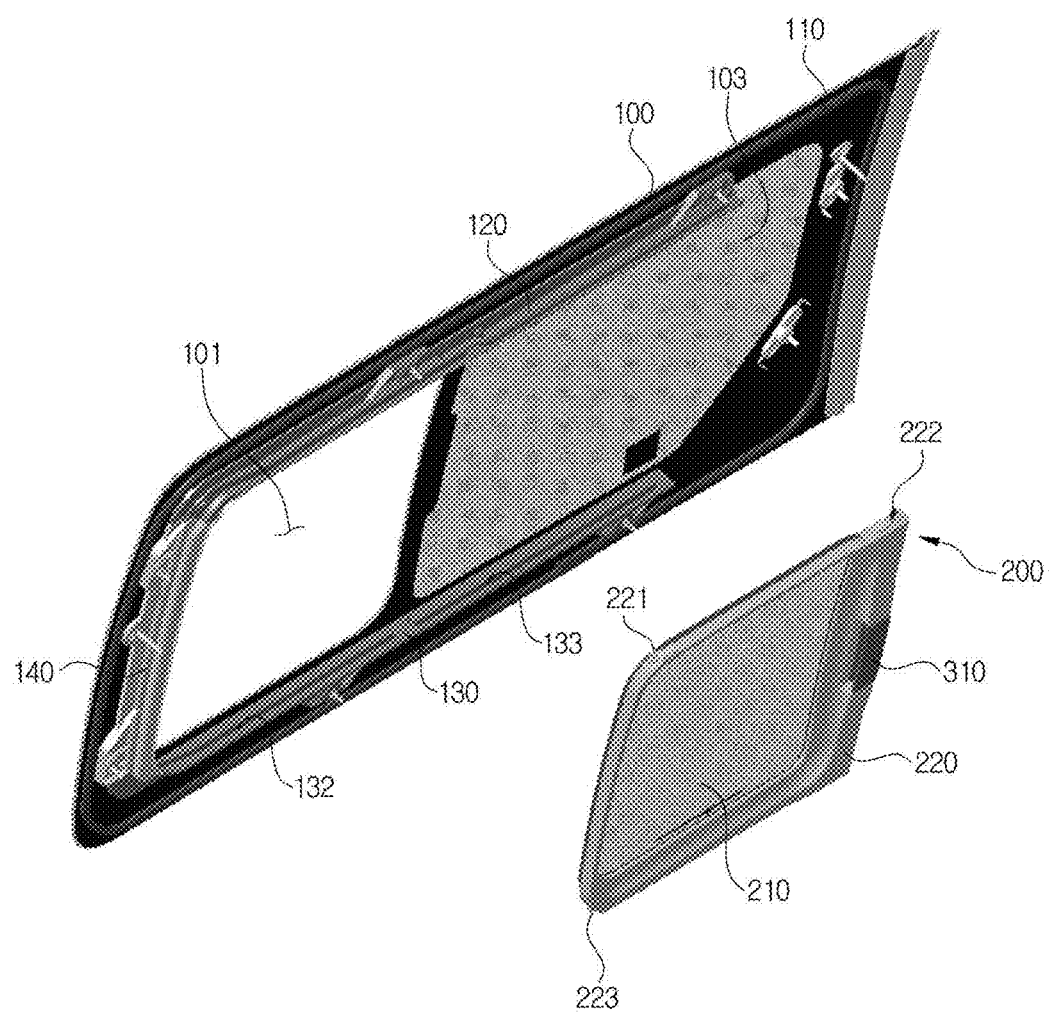
FIG. 3 is a perspective view illustrating a state in which the operation glass of the flush glass apparatus according to an embodiment of the disclosure is separated from a fixed glass.
Figure 4:
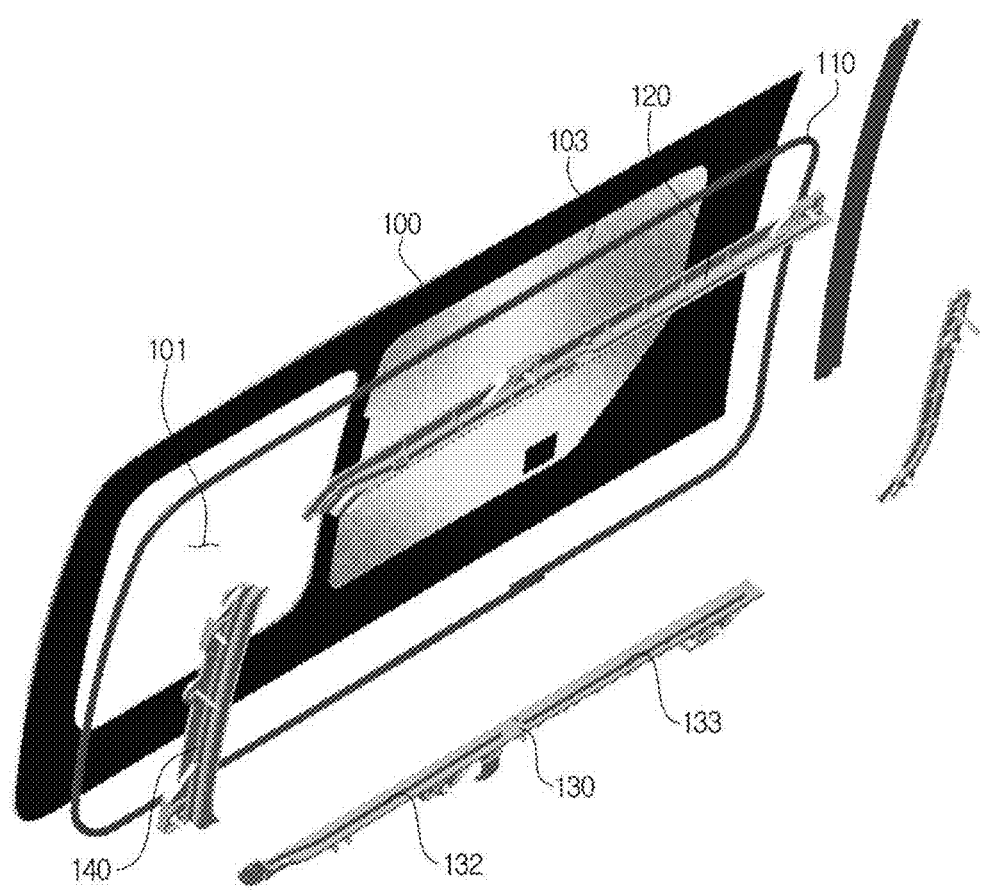
FIG. 4 is an exploded perspective view of parts of the fixed glass side of the flush glass apparatus according to an embodiment of the disclosure.

The fixed glass 100 may be formed in a rectangular panel shape having a long length in a transverse direction, as illustrated in FIGS. 3 and 4. The fixed glass 100 may be mounted in a state in which a rim portion thereof is sealed on a side surface of a vehicle body (not shown). The fixed glass 100 includes a see-through glass portion 103 and the opening 101 that is opened and closed by the operation glass 200.

A sealing member no, an upper rail 120, a lower rail 130, and a connection rail 140 may be mounted on an inner surface of the fixed glass 100.

The sealing member 110 is installed along an inner side of the rim portion of the fixed glass 100 so that the fixed glass 100 may maintain sealing when mounted on the vehicle body. The upper rail 120 guides a lateral sliding of the operation glass 200 while supporting an upper side of the operation glass 200, and the lower rail 130 guides the lateral sliding of the operation glass 200 while supporting a lower side of the operation glass 200. The connection rail 140 connects a front end of the upper rail 120 and a front end of the lower rail 130 at an inner side of the fixed glass 100 and is coupled to a front end of the operation glass 200 when the operation glass 200 is closed, so that the opening 101 may be sealed as illustrated in FIG. 1.

Figure 5:
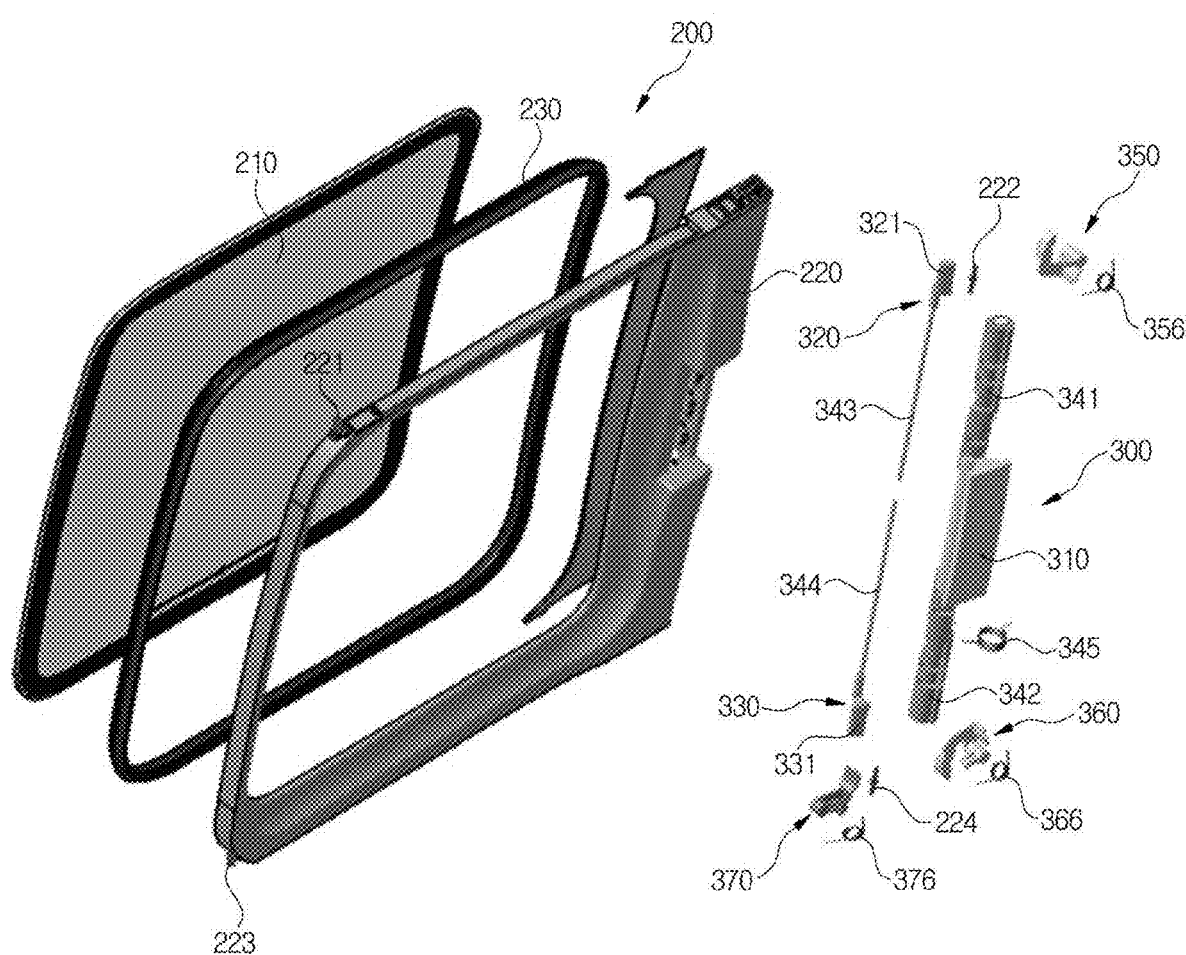
FIG. 5 is an exploded perspective view of the operation glass and a locking device of the flush glass apparatus according to an embodiment of the disclosure.

The operation glass 200 includes a see-through glass portion 210, a frame 220 supporting a rim portion of the glass portion 210, and a sealing member 230 coupled to an inner surface of a rim portion of the frame 220, as illustrated in FIGS. 3 and 5.

The rim portion of the glass portion 210 is attached to the frame 220, and the sealing member 230 is mounted on the frame 220 in a form surrounding a circumference of the glass portion 210. The sealing member 230 seals a gap between the operation glass 200 and the fixed glass 100 while coming into close contact with the inner surface of the fixed glass 100 when the operation glass 200 is closed.

Referring to FIGS. 4 and 5, the operation glass 200 includes upper guide pins 221 and 222 provided on opposite sides of an upper portion thereof to be coupled to the upper rail 120, and lower guide pins 223 and 224 provided on opposite sides of a lower portion thereof to be coupled to the lower rail 130.

The upper rail 120 is provided with a front upper guide groove and a rear upper guide groove extending in a lengthwise direction to slidably support the upper guide pins 221 and 222, respectively. The lower rail 130 is provided with a front lower guide groove 132 and a rear lower guide groove 133 extending in a lengthwise direction to slidably support the lower guide pins 223 and 224, respectively. Therefore, the operation glass 200 may slide in opening and closing directions without being separated from the upper rail 120 and the lower rail 130. Although the drawings do not clearly illustrate the front upper guide groove and the rear upper guide groove of the upper rail 120, they may be provided similar to the front lower guide groove 132 and the rear lower guide groove 133 of the lower rail 130 illustrated in FIG. 4.

As illustrated in FIGS. 5, 6A, and 6B, the locking device 300 may include an operation handle 310, an upper operation member 320, a lower operation member 330, an upper connection shaft 341, a lower connection shaft 342, an upper connection pin 343, a lower connection pin 344, a restoration spring 345, an upper locking lever 350, a first lower locking lever 360, and a second lower locking lever 370.

The operation handle 310 may be installed in a state of being exposed to an outer side of the frame 220 so that a user may easily operate the operation handle 310, and the remaining parts of the locking device 300 may be accommodated in the frame 220 or installed in a state of being exposed to a rear surface of the frame 220.

The operation handle 310 may be installed on a vertically middle portion of the frame 220 to be rotatable in the left and right directions. The operation handle 310 may be restored to its original state by an elastic restoring force of the restoration spring 345 installed on the lower connection shaft 342 side when an operation force by the user is released.

The upper operation member 320 is connected to the upper connection shaft 341 whose lower side is rotatably supported on the frame 220. The upper connection shaft 341 is connected so that the lower side thereof rotates together with the operation handle 310. Therefore, the upper operation member 320 may rotate together when the operation handle 310 rotates. The upper operation member 320 includes an eccentric rotation portion 321 to operate the upper locking lever 350 when rotated by the operation of the operation handle 310.

The lower operation member 330 is connected to the lower connection shaft 342 whose upper side is rotatably supported on the frame 220. The lower connection shaft 342 is connected so that an upper side thereof rotates together with the operation handle 310. Therefore, the lower operation member 330 may rotate together when the operation handle 310 rotates. The lower operation member 330 includes an eccentric rotation portion 331 to operate the first lower locking lever 360 or the second lower locking lever 370 when rotated by the operation of the operation handle 310.

Referring to FIG. 5, the upper connection shaft 341 and an upper side of the operation handle 310 may be rotatably supported on the frame 220 by mounting the upper connection pin 343 at a rotation center thereof. The lower connection shaft 342 and a lower side of the operation handle 310 may be rotatably supported on the frame 220 by mounting the lower connection pin 344 at a rotation center thereof. The restoration spring 345 may be installed on the lower connection shaft 342 when the lower connection pin 344 is mounted.

The upper locking lever 350 is rotatably installed on an upper side of the frame 220, as illustrated in FIGS. 5, 6A, 9A, and 9B. The upper locking lever 350 includes a rotation shaft 351 rotatably supported in a state of being accommodated in the upper side of the frame 220, a connection portion 352 extending forward from the rotation shaft 351, an upper locking portion 353 extending upward from an end of the connection portion 352 and protruding to the upper side of the frame 220, and a contact portion 354 that is pressed by the eccentric rotation portion 321 of the upper operation member 320.

Figure 9A:
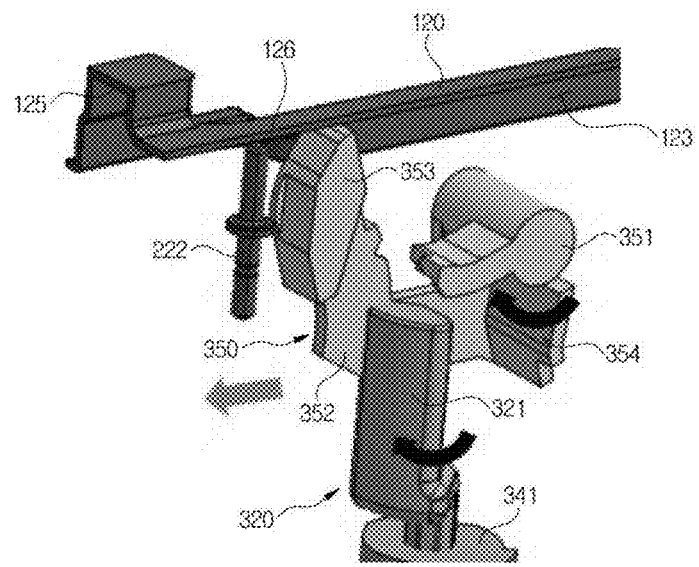
FIGS. 9A and 9B are perspective views of an upper locking lever and an upper operation member in the locking device of the flush glass apparatus according to an embodiment of the disclosure, illustrating operations step by step when the operation glass is closed.
Figure 9B:
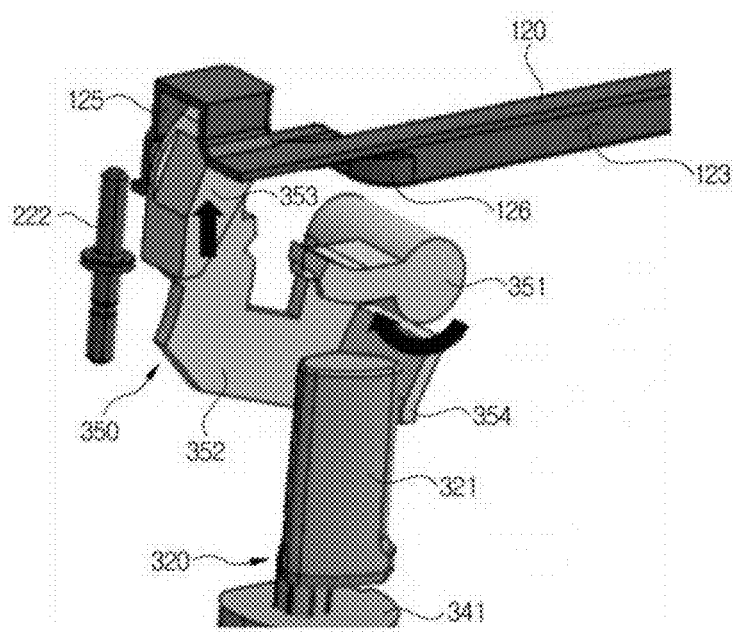
Figure 10A:
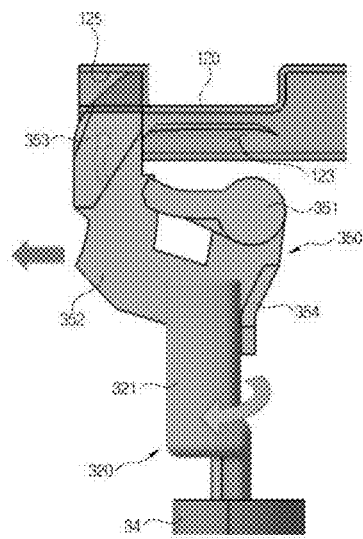
FIGS. 10A and 10B are front views of the upper locking lever and the upper operation member in the locking device of the flush glass apparatus according to an embodiment of the disclosure, illustrating operations when the operation glass is closed and opened, respectively.

On the rotation shaft 351 of the upper locking lever 350, a restoration spring 356 (see FIG. 5) is installed to rotate the upper locking lever 350 so that the upper locking portion 353 may protrude upward. Therefore, as illustrated in FIGS. 9A, 9B, and 10A, the upper locking lever 350 may maintain a state in which the upper locking portion 353 normally enters an upper guide groove 123 of the upper rail 120 by an elastic restoring force of the restoration spring 356, and may be caught on a locking groove 125 formed at a front end of the upper guide groove 123. That is, as illustrated in FIGS. 9B and 10A, when the operation glass 200 is completely closed, the upper locking lever 350 may be rotated in a locking direction by the elastic restoring force of the restoration spring 356 so that the upper locking portion 353 enters the locking groove 125 to lock the operation glass 200.

Figure 10B:
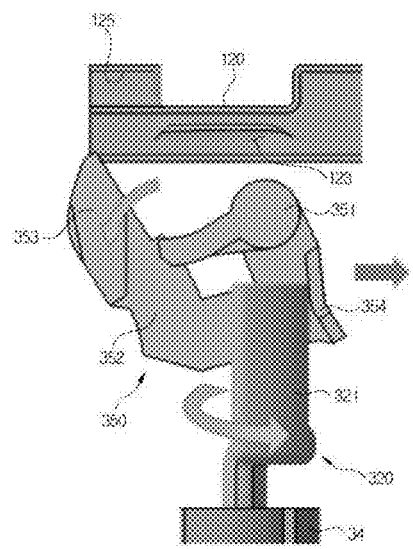

As illustrated in FIGS. 6B and 10B, when the upper operation member 320 is rotated in a direction of opening the operation glass 200 by the operation of the operation handle 310, the upper locking lever 350 may be rotated in a direction of releasing the locking by the contact portion 354 being pressed by the eccentric rotation portion 321 of the upper operation member 320.

As illustrated in FIGS. 5, 7A, 7B, 8A, and 8B, the first lower locking lever 360 is rotatably installed on a lower side of the frame 220 in the vertical direction. The first lower locking lever 360 includes a rotation shaft 361 rotatably supported in a state of being accommodated in the lower side of the frame 220, a connection portion 362 extending forward from the rotation shaft 361, a first lower locking portion 363 extending downward from an end of the connection portion 362 and protruding to the lower side of the frame 220, and a first contact portion 364 that is pressed by the eccentric rotation portion 331 of the lower operation member 330.

Figure 7A:
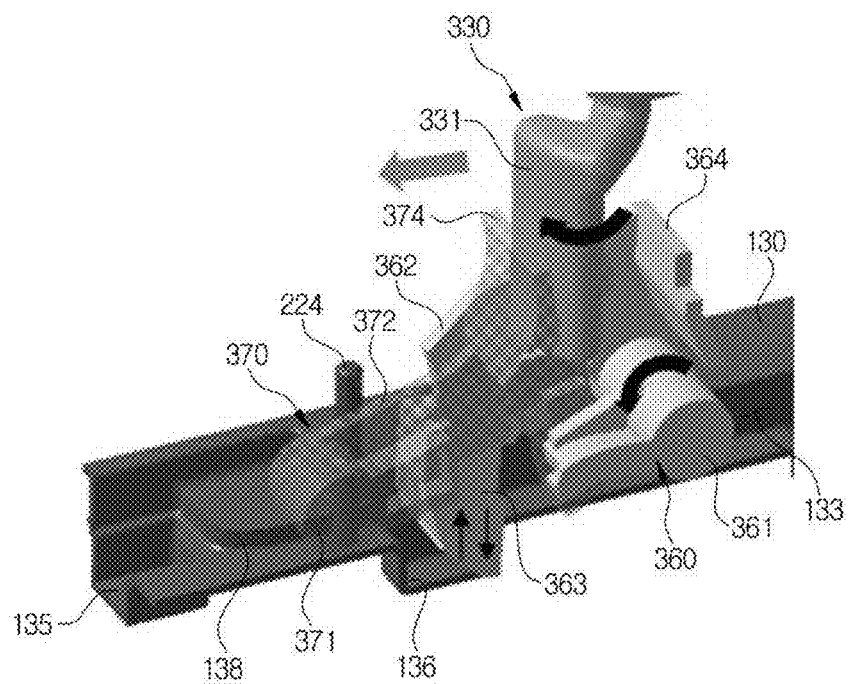
FIGS. 7A and 7B are perspective views of first and second lower locking levers and a lower operation member in the locking device of the flush glass apparatus according to an embodiment of the disclosure, illustrating operations when the operation glass is closed and opened, respectively.
Figure 7B:
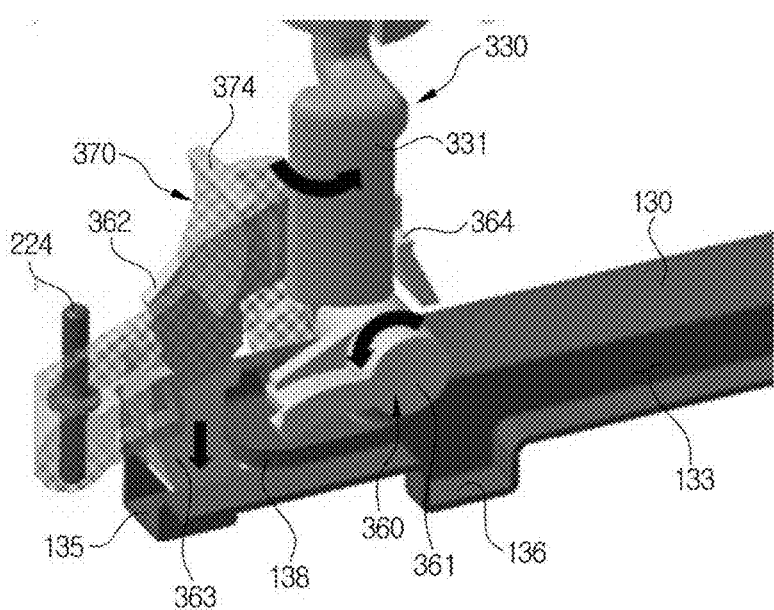
Figure 8A:
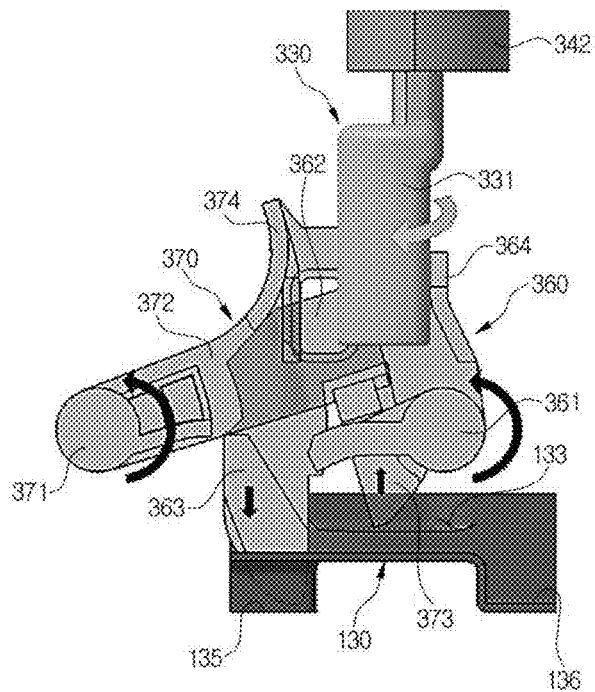
FIGS. 8A and 8B are front views of the first and second lower locking levers and the lower operation member in the locking device of the flush glass apparatus according to an embodiment of the disclosure, illustrating operations when the operation glass is closed and opened, respectively.

On the rotation shaft 361 of the first lower locking lever 360, a restoration spring 366 (see FIG. 5) is installed to rotate the first lower locking lever 360 so that the first lower locking portion 363 may protrude downward. Therefore, as illustrated in FIGS. 7A, 7B, and 8A, the first lower locking lever 360 may maintain a state in which the first lower locking portion 363 normally enters the lower guide groove 133 of the lower rail 130 and may be caught on a locking groove 135 (a closed-side locking groove) formed at a front end of the lower guide groove 133. Also, the first lower locking portion 363 may be caught on a plurality of intermediate locking grooves 136 formed in the lower guide groove 133. As illustrated in FIGS. 7B and 8A, when the operation glass 200 is completely closed, the first lower locking lever 360 may be rotated in a locking direction by an elastic restoring force of the restoration spring 366 so that the first lower locking portion 363 enters the locking groove 135 to lock the operation glass 200.

Figure 8B:
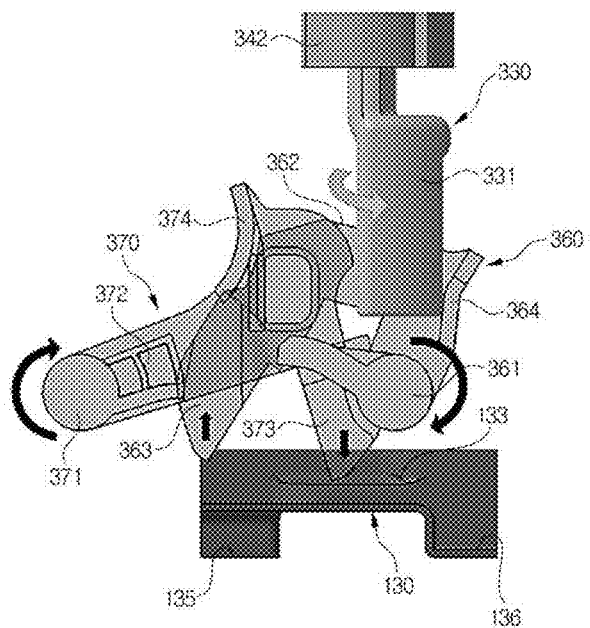

As illustrated in FIGS. 6B and 8B, when the lower operation member 330 is rotated in the direction of opening the operation glass 200 by the operation of the operation handle 310, the first lower locking lever 360 may be rotated in the direction [a direction in which the first lower locking portion 363 ascends] of releasing the locking by the first contact portion 364 being pressed by the eccentric rotation portion 331 of the lower operation member 330.

As illustrated in FIGS. 5, 8A, and 8B, the second lower locking lever 370 is rotatably installed in the front of the first lower locking lever 360 at the lower side of the frame 220 in the vertical direction. The second lower locking lever 370 is disposed such that a portion thereof overlaps with the first lower locking lever 360, and is installed to be rotated in the reverse direction when pressed by the eccentric rotation portion 331 of the lower operation member 330.

The second lower locking lever 370 includes a rotation shaft 371 rotatably supported in a state of being accommodated in the lower side of the frame 220 and spaced forward from the rotation shaft 361 of the first lower locking lever 360, a connection portion 372 extending rearward from the rotation shaft 371, a second lower locking portion 373 extending downward from an end of the connection portion 372 and protruding to the lower side of the frame 220, and a second contact portion 374 that is pressed by the eccentric rotation portion 331 of the lower operation member 330.

On the rotation shaft 371 of the second lower locking lever 370, a restoration spring 376 (see FIG. 5) is installed to rotate the second lower locking lever 370 so that the second lower locking portion 373 may protrude downward. Therefore, the second lower locking lever 370 may maintain a state in which the second lower locking portion 373 normally enters the lower guide groove 133 of the lower rail 130. Also, as illustrated in FIG. 11, the second lower locking portion 373 may be caught on a locking groove 137 (an opened-side locking groove) formed at a rear end of the lower guide groove 133 and the plurality of intermediate locking grooves 136 formed in the lower guide groove 133.

When the operation glass 200 is completely opened, the second lower locking lever 370 may be rotated in the locking direction by an elastic restoring force of the restoration spring 376 so that the second lower locking portion 373 enters the locking groove 137 in the rear of the lower guide groove 133 (see FIG. 11) to lock the operation glass 200. Also, as illustrated in FIG. 8A, when the lower operation member 330 is rotated in a direction of closing the operation glass 200 by the operation of the operation handle 310, the second lower locking lever 370 may be rotated in the direction [a direction in which the second lower locking portion 373 ascends] of releasing the locking by the second contact portion 374 being pressed by the eccentric rotation portion 331 of the lower operation member 330.

As illustrated in FIGS. 7A and 7B, the lower guide groove 133 includes a curved guide 138 to induce the guide pin 224 to an outdoor side so that an outer surface of the operation glass 200 forms the same plane as an outer surface of the fixed glass 100 when the operation glass 200 is completely closed, and the locking groove 135 is formed deeper downward so that the first lower locking portion 363 of the first lower locking lever 360 may be caught thereon in a state in which the operation glass 200 is completely closed. As illustrated in FIGS. 9A and 9B, for the same purpose, the upper guide groove 123 also includes a curved guide portion 126 to induce the guide pin 222 to the outdoor side when the operation glass 200 is completely closed, and the locking groove 125 is formed deeper upward so that the upper locking portion 353 of the upper locking lever 350 may be caught thereon in a state in which the operation glass 200 is completely closed.

Figure 11:
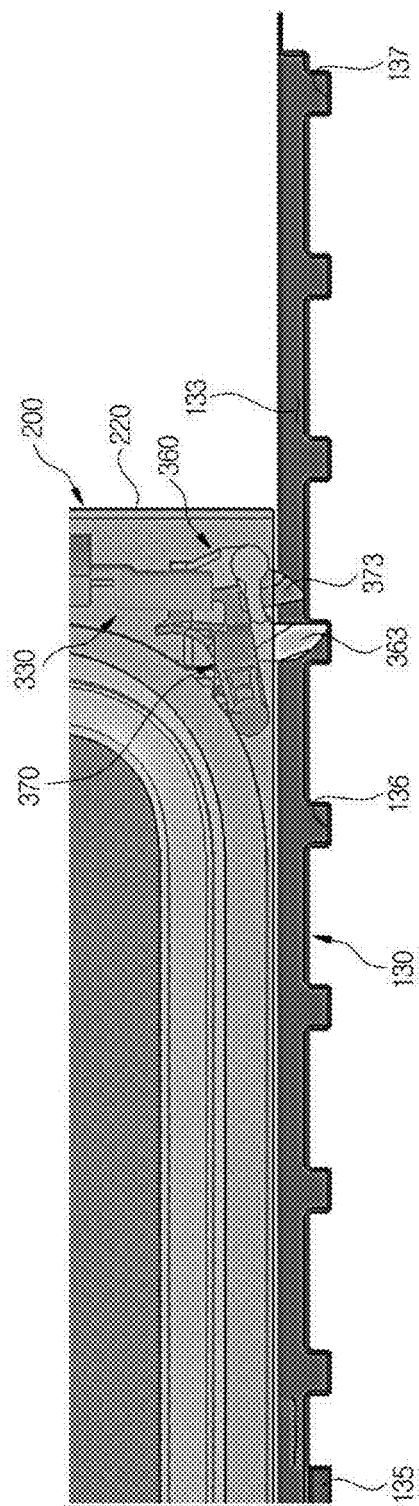
FIG. 11 illustrates a plurality of intermediate locking grooves provided in a lower guide groove of the flush glass apparatus according to an embodiment of the disclosure.
Figure 12:
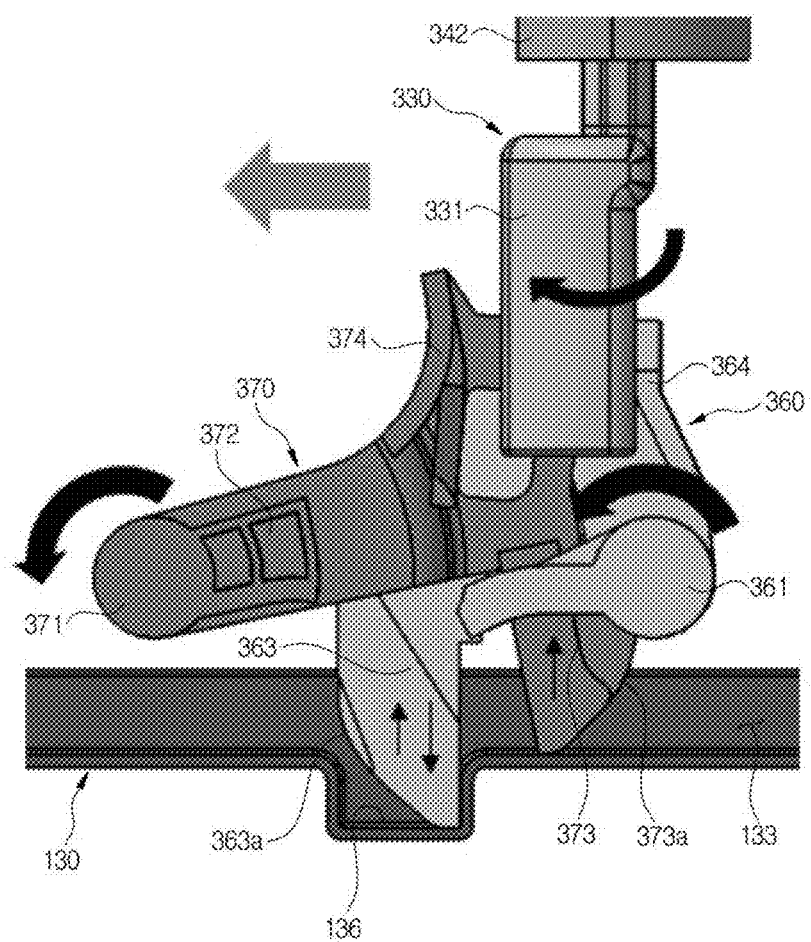
FIG. 12 is a front view of the first and second lower locking levers and the lower operation member in the locking device of the flush glass apparatus according to an embodiment of the disclosure, illustrating an operation when passing through the intermediate locking groove of the lower guide groove.

Referring to FIGS. 11 and 12, the lower guide groove 133 includes the plurality of intermediate locking grooves 136 formed deeper downward at positions spaced apart from each other in a moving direction of the operation glass 200 so that the first lower locking lever 360 or the second lower locking lever 370 may be caught thereon in a process of opening or closing the operation glass 200, and the locking groove 137 is formed deeper downward so that the second lower locking portion 373 of the second lower locking lever 370 may be caught thereon in a state in which the operation glass 200 is completely opened.

Referring to FIG. 12, the first lower locking portion 363 includes a first curved portion 363a provided on a lower side of a side surface thereof in the closing direction so that the operation glass 200 may move beyond the intermediate locking groove 136 when the operation glass 200 is moved in the closing direction. Also, the second lower locking portion 373 includes a second curved portion 373a provided on a lower side of a side surface thereof in the opening direction so that the operation glass 200 may also move beyond the intermediate locking groove 136 when the operation glass 200 is moved in the opening direction. A width of the intermediate locking groove 136 in the opening and closing directions may be equal to or larger than a width of the first lower locking portion 363 or the second lower locking portion 373.

Hereinafter, the operation of the flush glass apparatus described above will be described.

When the operation handle 310 is rotated in the closing direction to close the operation glass 200, as illustrated in FIGS. 7A, 8A, 9A, and 10A, the lower operation member 330 and the upper operation member 320 are rotated together with the operation handle 310 in the closing direction. At this time, the lower operation member 330 rotates the second lower locking lever 370 in the direction of releasing the locking by the eccentric rotation portion 331 pressing the second contact portion 374 of the second lower locking lever 370. Also, because the eccentric rotation portion 331 of the lower operation member 330 is spaced apart from the first contact portion 364 of the first lower locking lever 360, rotation of the first lower locking lever 360 in the locking direction is allowed. In this case, because the eccentric rotation portion 321 of the upper operation member 320 is also spaced apart from the contact portion 354 of the upper locking lever 350, rotation of the upper locking lever 350 in the locking direction is allowed.

When the operation glass 200 is moved in the closing direction in this state, as illustrated in FIGS. 7B, 8A, 9B, and 10A, the upper locking portion 353 of the upper locking lever 350 and the first lower locking portion 363 of the first lower locking lever 360 enter and are caught on the locking grooves 125 and 135, respectively. In this state, the operation glass 200 is not opened as long as the operation handle 310 is not operated.

When the operation handle 310 is released after the operation glass 200 is completely closed, the operation handle 310 is returned to its original state by the elastic restoring force of the restoration spring 345, and as illustrated in FIGS. 7B and 9B, the upper operation member 320 and the lower operation member 330 are also returned to their original state.

Referring to FIGS. 11 and 12, when the operation of the operation handle 310 is released in a process of moving the operation glass 200 in the opening or closing direction by operating the operation handle 310, because the lower operation member 330 is restored to its original state together with the operation handle 310, the lower operation member 330 may be spaced apart from both the first and second contact portions 364 and 374 of the first and second lower locking levers 360 and 370. Therefore, because the first and second lower locking levers 360 and 370 are all intended to rotate in the locking direction by the restoring force of the restoration springs 366 and 376, the first lower locking portion 363 or the second lower locking portion 373 may be caught on the intermediate locking groove 136 and stopped. That is, the operation glass 200 may be stopped in a partially open state.

When the operation handle 310 is rotated in the opening direction in a state in which the operation glass 200 is closed, as illustrated in FIGS. 8B and 10B, the eccentric rotation portion 331 of the lower operation member 330 presses the first contact portion 364 of the first lower locking lever 360 to rotate the first lower locking lever 360 in the direction of releasing the locking. Also, the eccentric rotation portion 321 of the upper operation member 320 presses the contact portion 354 of the upper locking lever 350 to rotate the upper locking lever 350 in the direction of releasing the locking. Therefore, the operation glass 200 may be opened in this state.

In the process of opening the operation glass 200, the lower operation member 330 maintains a state in which the locking of the first lower locking lever 360 is released, and the second lower locking lever 370 is intended to rotate in the locking direction, but the second curved portion 373a may move beyond the intermediate locking groove 136. Therefore, the operation glass 200 may be smoothly opened up to a final opened position as long as the operation of the operation handle 310 is maintained in the process of being opened. In the process of closing the operation glass 200, the lower operation member 330, the first lower locking lever 360, and the second lower locking lever 370 operate as opposed to the above case. Therefore, the operation glass 200 may be smoothly closed up to a final closed position as long as the operation of the operation handle 310 is maintained in the process of being closed.

When the operation glass 200 is moved to the completely opened position, the second lower locking lever 370 rotates in the locking direction so that the second lower locking portion 373 is caught on the locking groove 137 located at the rearmost portion of the lower guide groove 133. The operation glass 200 does not move in the closing direction as long as the operation handle 310 is not operated in this state. Also, the complete opening of the operation glass 200 is maintained.

As such, the flush glass apparatus according to the present embodiment may move the operation glass 200 in a desired direction simply by an operation to rotate the operation handle 310 of the locking device 300 in the opening or closing direction, so that the operation glass 200 may be easily opened and closed.

Further, the flush glass apparatus according to the present embodiment may provide a beautiful appearance because the operation handle 310 may be restored to its original state from the opened state, the closed state, and a half opened state of the operation glass 200.

Further, in the flush glass apparatus according to the present embodiment, a slight hitting sound is generated as the upper locking portion 353 of the upper locking lever 350 and the first lower locking portion 363 of the first lower locking lever 360 enter the locking grooves 125 and 135, respectively, when the operation glass 200 is closed, so that the user may easily recognize whether the operation glass 200 is completely closed.

As is apparent from the above, a flush glass apparatus according to an embodiment of the disclosure can move an operation glass in a desired direction simply by an operation to rotate an operation handle in an opening or closing direction, so that the operation glass can be easily opened and closed.

Further, the flush glass apparatus according to an embodiment of the disclosure can provide a beautiful appearance because the operation handle is restored to its original state from an opened state, a closed state, and a half opened state of the operation glass.

Further, in the flush glass apparatus according to an embodiment of the disclosure, a slight hitting sound is generated as an upper locking portion of an upper locking lever and a first lower locking portion of a first lower locking lever enter locking grooves, respectively, when the operation glass is closed, so that a user can easily recognize whether the operation glass is completely closed.

What is claimed is:
1. A flush glass apparatus comprising:
an operation glass comprising a glass portion and a frame and configured to open and close an opening of a fixed glass by sliding in a lateral direction; and
a locking device configured to lock and unlock the operation glass, wherein the locking device comprises:
an operation handle installed on the frame to be rotated left and right and configured to be restored to its original state by a restoration spring;
an upper locking lever installed on an upper side of the frame and configured to lock the operation glass by rotating in a locking direction by an elastic restoring force when the operation glass is completely closed;
a first lower locking lever installed on a lower side of the frame and configured to lock the operation glass by rotating in the locking direction by an elastic restoring force when the operation glass is completely closed;
a second lower locking lever installed on the lower side of the frame and configured to lock the operation glass by rotating in the locking direction by an elastic restoring force when the operation glass is completely opened;
an upper operation member installed on the upper side of the frame, connected to the operation handle, and configured to rotate the upper locking lever in a direction of releasing the locking when rotating in an opening direction by an operation of the operation handle;
a lower operation member installed on the lower side of the frame, connected to the operation handle, and configured to rotate the first lower locking lever in the direction of releasing the locking when rotating in the opening direction by the operation of the operation handle and to rotate the second lower locking lever in the direction of releasing the locking when rotating in a closing direction by the operation of the operation handle;

an upper rail comprising an upper guide groove to slidingly support guide pins provided on an upper portion of the frame; and
a lower rail comprising a lower guide groove to slidingly support guide pins provided on a lower portion of the frame, wherein the upper guide groove and the lower guide groove each comprise a curved guide portion configured to induce the guide pins to an outdoor side so that an outer surface of the operation glass forms the same plane as an outer surface of the fixed glass when the operation glass is completely closed.

2. The flush glass apparatus according to claim 1, wherein the upper guide groove and the lower guide groove each further comprise a locking groove formed deeper upward or downward than the upper guide groove or the lower guide groove so that the upper locking lever or the first lower locking lever is caught thereon in a state in which the operation glass is completely closed.

3. The flush glass apparatus according to claim 2, wherein the upper locking lever comprises:
an upper locking portion provided at an eccentric position from a rotation shaft thereof and configured to enter the locking groove of the upper guide groove by rotation; and
a contact portion configured to be pressed by an eccentric rotation portion of the upper operation member to rotate in the direction of releasing the locking when the upper operation member rotates in the direction of opening the operation glass.

4. The flush glass apparatus according to claim 2, wherein the lower guide groove comprises:
a plurality of intermediate locking grooves formed deeper downward than the lower guide groove at positions spaced apart from each other in a moving direction of the operation glass so that the first lower locking lever or the second lower locking lever is caught thereon in a process of opening or closing the operation glass; and
a locking groove formed deeper downward than the lower guide groove so that the second lower locking lever is caught thereon in a state in which the operation glass is completely opened.

5. The flush glass apparatus according to claim 4, wherein the first lower locking lever comprises:
a first lower locking portion provided at an eccentric position from a rotation shaft thereof and configured to enter a closed-side locking groove of the lower guide groove or one of the intermediate locking grooves by rotation; and
a first contact portion configured to be pressed by an eccentric rotation portion of the lower operation member to rotate in the direction of releasing the locking when the lower operation member rotates in the direction of opening the operation glass.

6. The flush glass apparatus according to claim 5, wherein the second lower locking lever comprises:
a second lower locking portion provided at an eccentric position from a rotation shaft thereof and configured to enter an opened-side locking groove of the lower guide groove or one of the intermediate locking grooves by rotation; and
a second contact portion configured to be pressed by the eccentric rotation portion of the lower operation member to rotate in the direction of releasing the locking when the lower operation member rotates in the direction of closing the operation glass.

7. The flush glass apparatus according to claim 6, wherein:
the first lower locking portion comprises a first curved portion provided at a lower side of a side surface thereof in the closing direction so that the operation glass moves beyond the intermediate locking groove when moving in the closing direction; and
the second lower locking portion comprises a second curved portion provided at a lower side of a side surface thereof in the opening direction so that the operation glass moves beyond the intermediate locking groove when moving in the opening direction.

8. The flush glass apparatus according to claim 7, wherein a width of the intermediate locking groove in the opening and closing directions is equal to or larger than a width of the first or second lower locking portion in the opening and closing directions.

9. The flush glass apparatus according to claim 1, further comprising:
an upper connection shaft connecting the upper operation member and the operation handle and rotatably supported on the frame; and
a lower connection shaft connecting the lower operation member and the operation handle and rotatably supported on the frame.

10. A vehicle comprising:
a vehicle body;
a fixed glass coupled to the vehicle body;
an operation glass comprising a glass portion and a frame and configured to open and close an opening of the fixed glass by sliding in a lateral direction; and
a locking device configured to lock and unlock the operation glass, wherein the locking device comprises:
an operation handle installed on the frame to be rotated left and right and configured to be restored to its original state by a restoration spring;
an upper locking lever installed on an upper side of the frame and configured to lock the operation glass by rotating in a locking direction by an elastic restoring force when the operation glass is completely closed;
a first lower locking lever installed on a lower side of the frame and configured to lock the operation glass by rotating in the locking direction by an elastic restoring force when the operation glass is completely closed;
a second lower locking lever installed on the lower side of the frame and configured to lock the operation glass by rotating in the locking direction by an elastic restoring force when the operation glass is completely opened;
an upper operation member installed on the upper side of the frame, connected to the operation handle, and configured to rotate the upper locking lever in a direction of releasing the locking when rotating in an opening direction by an operation of the operation handle;
a lower operation member installed on the lower side of the frame, connected to the operation handle, and configured to rotate the first lower locking lever in the direction of releasing the locking when rotating in the opening direction by the operation of the operation handle and to rotate the second lower locking lever in the direction of releasing the locking when rotating in a closing direction by the operation of the operation handle;

an upper rail comprising an upper guide groove to slidingly support guide pins provided on an upper portion of the frame; and a lower rail comprising a lower guide groove to slidingly support guide pins provided on a lower portion of the frame, wherein the upper guide groove and the lower guide groove each comprise a curved guide portion configured to induce the guide pins to an outdoor side so that an outer surface of the operation glass forms the same plane as an outer surface of the fixed glass when the operation glass is completely closed.

11. The vehicle according to claim 10, wherein the upper guide groove and the lower guide groove each comprise a locking groove formed deeper upward or downward than the upper guide groove or the lower guide groove so that the upper locking lever or the first lower locking lever is caught thereon in a state in which the operation glass is completely closed.

12. The vehicle according to claim 11, wherein the upper locking lever comprises:
an upper locking portion provided at an eccentric position from a rotation shaft thereof and configured to enter the locking groove of the upper guide groove by rotation; and
a contact portion configured to be pressed by an eccentric rotation portion of the upper operation member to rotate in the direction of releasing the locking when the upper operation member rotates in the direction of opening the operation glass.

13. The vehicle according to claim 11, wherein the lower guide groove comprises:
a plurality of intermediate locking grooves formed deeper downward than the lower guide groove at positions spaced apart from each other in a moving direction of the operation glass so that the first lower locking lever or the second lower locking lever is caught thereon in a process of opening or closing the operation glass; and
a locking groove formed deeper downward than the lower guide groove so that the second lower locking lever is caught thereon in a state in which the operation glass is completely opened.

14. The vehicle according to claim 13, wherein the first lower locking lever comprises:
a first lower locking portion provided at an eccentric position from a rotation shaft thereof and configured to enter a closed-side locking groove of the lower guide groove or one of the intermediate locking grooves by rotation; and
a first contact portion configured to be pressed by an eccentric rotation portion of the lower operation member to rotate in the direction of releasing the locking when the lower operation member rotates in the direction of opening the operation glass.

15. The vehicle according to claim 14, wherein the second lower locking lever comprises:
a second lower locking portion provided at an eccentric position from a rotation shaft thereof and configured to enter an opened-side locking groove of the lower guide groove or one of the intermediate locking grooves by rotation; and
a second contact portion configured to be pressed by the eccentric rotation portion of the lower operation member to rotate in the direction of releasing the locking when the lower operation member rotates in the direction of closing the operation glass.

16. The vehicle according to claim 15, wherein:
the first lower locking portion comprises a first curved portion provided at a lower side of a side surface thereof in the closing direction so that the operation glass moves beyond the intermediate locking groove when moving in the closing direction; and
the second lower locking portion comprises a second curved portion provided at a lower side of a side surface thereof in the opening direction so that the operation glass moves beyond the intermediate locking groove when moving in the opening direction.

17. The vehicle according to claim 16, wherein a width of the intermediate locking groove in the opening and closing directions is equal to or larger than a width of the first or second lower locking portion in the opening and closing directions.

18. The vehicle according to claim 10, further comprising:
an upper connection shaft connecting the upper operation member and the operation handle and rotatably supported on the frame; and
a lower connection shaft connecting the lower operation member and the operation handle and rotatably supported on the frame.

19. A flush glass apparatus comprising:
an operation glass comprising a glass portion and a frame and configured to open and close an opening of a fixed glass by sliding in a lateral direction; and
an operation handle installed on the frame to be rotated left and right and configured to be restored to its original state by a restoration spring;
an upper locking lever installed on an upper side of the frame and configured to lock the operation glass by rotating in a locking direction by an elastic restoring force when the operation glass is completely closed;
a first lower locking lever installed on a lower side of the frame and configured to lock the operation glass by rotating in the locking direction by an elastic restoring force when the operation glass is completely closed;
a second lower locking lever installed on the lower side of the frame and configured to lock the operation glass by rotating in the locking direction by an elastic restoring force when the operation glass is completely opened;
an upper operation member installed on the upper side of the frame, connected to the operation handle, and configured to rotate the upper locking lever in a direction of releasing the locking when rotating in an opening direction by an operation of the operation handle;
a lower operation member installed on the lower side of the frame, connected to the operation handle, and configured to rotate the first lower locking lever in the direction of releasing the locking when rotating in the opening direction by the operation of the operation handle and to rotate the second lower locking lever in the direction of releasing the locking when rotating in a closing direction by the operation of the operation handle;
an upper rail comprising an upper guide groove to slidingly support guide pins provided on an upper portion of the frame;
a lower rail comprising a lower guide groove to slidingly support guide pins provided on a lower portion of the frame, wherein the upper guide groove and the lower guide groove each comprise a curved guide portion configured to induce the guide pins to an outdoor side so that an outer surface of the operation glass forms the same plane as an outer surface of the fixed glass when the operation glass is completely closed and wherein the upper guide groove and the lower guide groove each further comprise a locking groove formed deeper upward or downward than the upper guide groove or the lower guide groove so that the upper locking lever or the first lower locking lever is caught thereon in a state in which the operation glass is completely closed;

an upper connection shaft connecting the upper operation member and the operation handle and rotatably supported on the frame; and a lower connection shaft connecting the lower operation member and the operation handle and rotatably supported on the frame.

20. The flush glass apparatus according to claim 19, wherein the lower guide groove comprises:

a plurality of intermediate locking grooves formed deeper downward than the lower guide groove at positions spaced apart from each other in a moving direction of the operation glass so that the first lower locking lever or the second lower locking lever is caught thereon in a process of opening or closing the operation glass; and a locking groove formed deeper downward than the lower guide groove so that the second lower locking lever is caught thereon in a state in which the operation glass is completely opened.

* * * * *